United States Patent [19]

Plummer

[11] Patent Number: 4,687,926
[45] Date of Patent: Aug. 18, 1987

[54] SPECTRALLY FILTERED LENS PRODUCING PLURAL F-NUMBERS WITH DIFFERENT SPECTRAL CHARACTERISTICS

[75] Inventor: William T. Plummer, Concord, Mass.

[73] Assignee: Polaroid Corporation, Cambridge, Mass.

[21] Appl. No.: 684,094

[22] Filed: Dec. 20, 1984

[51] Int. Cl.⁴ .............................. H01J 5/16; G02B 5/22
[52] U.S. Cl. ...................................... 250/226; 350/317
[58] Field of Search .................... 250/216, 226, 237 R; 350/463, 474, 475, 311, 314, 315, 317; 351/165; 358/55; 354/482

[56] References Cited

U.S. PATENT DOCUMENTS

| | | | |
|---|---|---|---|
| 1,332,410 | 3/1920 | Potts | 351/165 |
| 2,086,791 | 7/1937 | Dresler | 88/1 |
| 2,416,918 | 3/1947 | Goldsmith | 350/317 |
| 3,006,265 | 10/1961 | LaRue, Jr. | 95/64 |
| 3,397,023 | 8/1968 | Land | 350/160 |
| 3,700,314 | 10/1972 | Busby, Jr. | 350/314 |
| 3,821,794 | 6/1974 | Yoneyama | 350/317 X |
| 3,903,413 | 9/1975 | Manning | 250/226 |
| 3,911,479 | 10/1975 | Sakurai | 358/44 |
| 3,914,024 | 10/1975 | Tanabe et al. | 350/196 |
| 3,944,739 | 3/1976 | Sword et al. | 178/7.85 |
| 3,987,243 | 10/1976 | Schwartz | 178/6.8 |
| 4,040,751 | 8/1977 | Baker et al. | 356/225 |
| 4,058,827 | 11/1977 | Ando et al. | 358/55 |
| 4,067,043 | 1/1978 | Perry | 358/55 |
| 4,225,771 | 9/1980 | Justice et al. | 219/137 |
| 4,315,675 | 2/1982 | Johnson | 354/26 |
| 4,325,616 | 4/1982 | Dietz | 354/27 |
| 4,351,593 | 9/1982 | Johnson et al. | 354/27 |
| 4,358,186 | 11/1982 | Johnson et al. | 354/27 |
| 4,428,654 | 1/1984 | Dietz | 354/413 |
| 4,474,441 | 10/1984 | Millard | 354/413 |

OTHER PUBLICATIONS

"CCD Imaging" Electro 77 Professional Program, Apr. 19-21, 1977.

Primary Examiner—Eugene R. Laroche
Assistant Examiner—David Mis
Attorney, Agent, or Firm—Leslie J. Payne

[57] ABSTRACT

A photoresponsive apparatus is disclosed which includes a photoresponsive device that provides an output or response having a characteristic which varies as a function of the radiant power and wavelength incident on a photoresponsive surface thereof. Included is a spectral filtering means associated with an optical assembly so as to provide the assembly with different f-number zones for each of the respectively different proportionalities of wavelengths such that the spectral composition of incident radiation reaching the surface is controlled by the spectral filtering means to effect a desired change in the response of the photoresponsive device.

23 Claims, 6 Drawing Figures 4,687,926

SPECTRALLY FILTERED LENS PRODUCING PLURAL F-NUMBERS WITH DIFFERENT SPECTRAL CHARACTERISTICS

BACKGROUND OF THE INVENTION

Photoelectric detectors are devices in which radiant energy incident thereon produces electrical effects. Detectors of this kind are used in a wide variety of applications. One known detector is referred to as a charge-couple device (CCD). Essentially, charge couple devices convert incident spectral energy to video signals which are used subsequently in, for example, electronic imaging devices.

For well known reasons, it is desirable to have the spectral sensitivities of such photodetectors match generally that of the human visual response. However, there are a number of factors causing differences between these sensitivities. A rather common cause is the nature of the material used for the photodetector. For example, charge-couple devices (CCD$^s$) of the silicon type have relative spectral responses more sensitive to red and infrared wavelengths and tend to be less responsive to blue light. Accordingly, the blue content of the images generated from such video signals tend to be noisy (i.e. there is a relatively high signal to noise ratio). This is, of course, undesirable.

Another factor affecting the response of the photodetectors is the nature of the relative spectral composition of the light incident thereon. For instance, in familiar artificial illumination conditions involving tungsten-type light, there exists a relatively small blue spectral component. Hence, the resulting blue component of the output signal generated by the photodetector will be relatively weak. Such weakness is, of course, compounded if the photodetector itself, tends to be of the silicon type, which as noted is relatively less sensitive to blue light.

It is well known in the field that one can alter the spectral sensitivity of photodetectors so as to compensate for inherent biases in sensitivity of the photodetectors themselves or for certain scene lighting situations.

It is common practice to place a filter element or combination of filter elements in the optical path before the photodetector in order to correct the spectral response. By change or correction to the spectral response, it is meant that the spectral composition of the radiant energy incident on the photodetector is altered so as to conform it with a predetermined standard or reference, for instance, the sensitivity of the human eye or of a particular CCD or photographic film.

Commonly assigned U.S. Pat. No. 3,903,413 describes use of an optical filter having spectral absorption characteristics that change or correct the spectral sensitivity of a silicon type photodetector. In this manner, the photodetector was made less sensitive to red and near infrared spectral wavelengths. Therefore, the output of the photodetector is relatively more sensitive to blue spectral wavelengths incident thereon.

With reference again to the fact that the charge-couple devices are relatively insensitive to blue wavelengths, it is known to use photodiodes that are doped suitably so as to be more sensitive to blue light. Alternatively, it has been proposed to boost the gain of the blue component of the signal from the charge couple device to compensate for such relative insensitivity.

There are other approaches for modifying the spectral composition of scene light incident on, for example, a silicon type photodetector. The following commonly assigned patents are examples of some of these approaches: U.S. Pat. Nos. 4,351,593; 4,325,616; 4,315,675; 4,358,186; and 4,428,654. All of the above patents, with the exception of the last one, are generally directed to alternating between different spectral wavelengths during an exposure. This is achieved essentially by controlling scene light passing through a photocell lens that cooperates with different spectrally filtered zones. In U.S. Pat. No. 4,428,654 there is disclosed a spectral filter stationarily interposed between a photocell lens and detector. The filter includes different spectral segments which correspondingly direct different proportionalities of wavelenghts simultaneously to the photodetector. In this manner scene light from different scene zones are treated differently. However, in this situation, there is no uniform distribution of the wavelengths over the entire photodetector, but rather the formation of distinct spectral zones on the photodetector itself.

Another known approach for modifying spectral composition of light incident on the photodetector utilizes bands of red, green and blue filters at the aperture stop of an imaging lens. Such a filter arrangement has been used for converting black and white images into color images. In such an approach a lenticular plate is used to dissect the light into red, green and blue stripes. This approach solves a different problem than that which the present invention solves, and again distinct spectral zones are formed on the photodetector itself.

SUMMARY OF THE INVENTION

It is an object of the invention to provide an improved photoresponsive apparatus which overcomes some of the shortcomings noted above.

In this connection, provision is made for a photoresponsive apparatus including a photoresponsive device and an optical system. The photoresponsive device provides a response varying as a function of the spectral composition of radiation incident thereon. The optical system is structured and arranged to collect scene radiation from a given field of view and direct it to a photoresponsive device.

In an illustrated embodiment, the photoresponsive apparatus includes a spectral filter arrangement which is structured and arranged with respect to the optical system and photoresponsive device so that it alters the spectral composition of radiation passing through said optical assembly into at least two spectral zones, having different spectral compositions and different f-numbers which are then simultaneously directed onto the photoresponsive device, whereby there is effected a desired change in the response of the photoresponsive device.

In a preferred embodiment, the filter has generally annular configuration and defines the bounds of a non-filtered central zone configuration. The filter transmits substantially blue wavelengths, while the non-filtered central zone transmits at least red, green and blue wavelengths. Owing to this arrangement, a first zone is essentially inclusive of the annular filter and the central zone, whereas a second zone is essentially inclusive of the central zone. Accordingly, the blue content of the spectral energy incident on the photoresponsive device is increased. Moreover, because of this arrangement there is a picture sharpness advantage in any case wherein the image is imperfectly focused on the photodetector. Because the red and green wavelengths are restricted to a smaller lens opening, the image formed by them may be adequately sharp, even if it would not be sharp with the entire lens aperture open to them. For the same error in focus, the blue wavelengths will, of course, exhibit a larger blur, but the present invention recognizes and takes advantage of the significance that the human eye is less discerning of out-of-focus blue light. Thus, one can improve the blue content of incident radiation without sacrificing apparent sharpness of blue light.

In this regard, the optical system can use a lens which is well corrected for the central zone, while that peripheral lens portion in conjunction with the optical filter need not be as well corrected.

In another preferred embodiment, the filter material can be carried by a blade and define, in part, the lens aperture. During scanning movement of a pair of such blades, the filters are shaped and arranged to progressively coincide in overlying relationship to the lens aperture. In this manner, they define a pair of spectral zones similar to that described above. The dimension of the pair of spectral zones will change in accordance to the relative positioning of the apertures during scanning. In an illustrated embodiment, the aperture area open to blue light is about 4 times as great as that open to green or red.

Among the objects of the invention are, therefore, the provision of a photoresponsive apparatus including a spectral filter which is positioned and constructed to provide the optical system with different f-numbers corresponding to different spectral wavelengths incident on a photoresponsive device so as to correct or compensate for certain wavelength biases of the photoresponsive device; the provision of a spectral filter of the kind last noted which is defined as a blue spectral filter and is formed in an annular shape which also defines the bounds of a central zone which passes not only blue, but also red and green wavelengths; the provision of a spectral filter of the character last noted, wherein the wavelengths passing through the central zone are in adequate focus although the image is not in proper focus for any of the light; the provision of a spectral filter which is carried by a blade and which forms part of the aperture; and the provision of a spectral filter carried by a pair of blades which progressively coincide to define different spectral zones having different f-numbers.

Other objects and further scope of applicability of the present invention will become apparent from the detailed description to follow when taken in conjunction with the accompanying drawings in which like parts are designated by the reference numerals.

DETAILED DESCRIPTION

Figure 1:
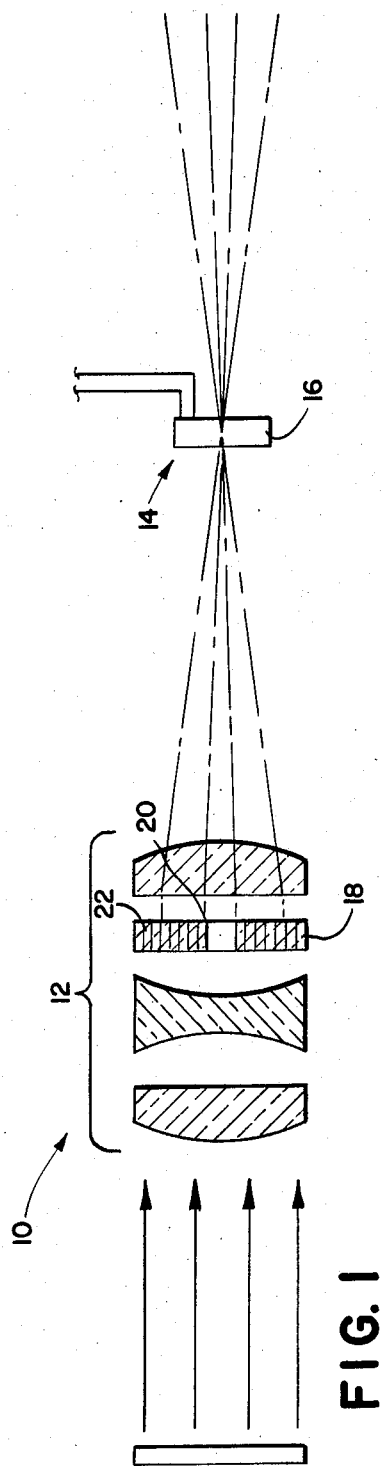
FIG. 1 is a diagrammatic view showing one embodiment of a photoresponsive apparatus made in accordance with the present invention.

Reference is made to FIG. 1 of the drawings for showing an embodiment of the present invention. As illustrated, there is depicted a photoresponsive apparatus 10 including a lens or optical assembly 12 and a photoelectric detector 14. In the present embodiment, the optical assembly 12 includes a plurality of lens elements which form a lens triplet. The lens or optical assembly 12 collects scene radiation from a given field of view and focuses it onto the detector 14. Although a triplet is used, it will be understood that the principles of the present invention allow use of other kinds of lens arrangements (e.g. singlet, doublet etc.). In this embodiment the lens elements are shown separated, but, in fact, are joined together in conventional fashion. In the present embodiment, the lens assembly 12 serves to collect scene radiation from a given field of view and focus it onto an array of pixels forming a charge-coupled device (CCD) 16. The charge-couple device 16 may be of the kind usable in electronic imaging devices (e.g. televisions). Although a CCD type device will be described in this embodiment it should be understood that other kinds of photodetectors, such as photographic film, may be used as well. It will be appreciated that throughout the specification and claims that a photoresponsive device or photodetector can be inclusive of photographic film. Also for purposes of description, the CCD device is of the silicon type. In this connection, therefore, the CCD array 16 is more sensitive to red and infrared wavelengths and less sensitive to blue light. The present invention overcomes the bias of the CCD device 16 against blue light without sacrificing loss of sharpness by the viewer of images generated by such signals.

Figure 2:
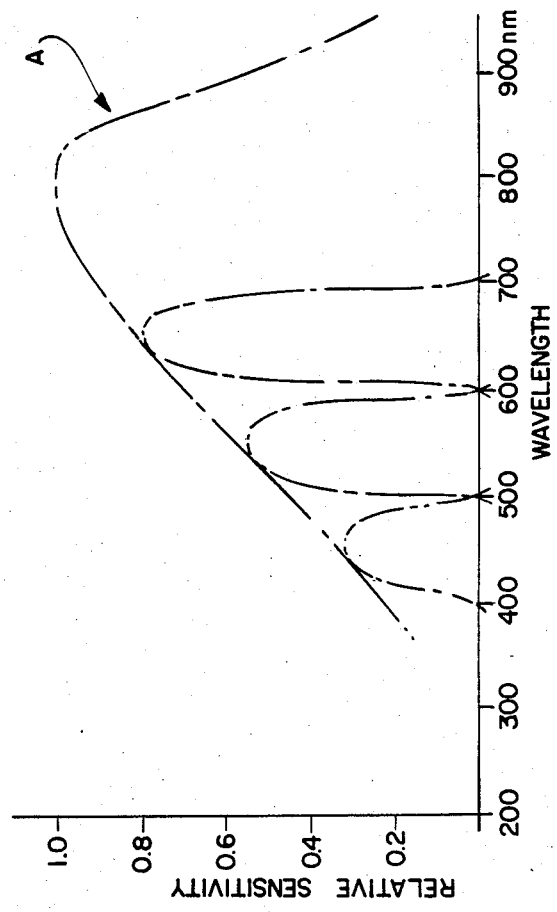
FIG. 2 is a graph showing the relative spectral sensitivity of a silicon type charge couple device, separated into its red, green and blue components.
Figure 3:
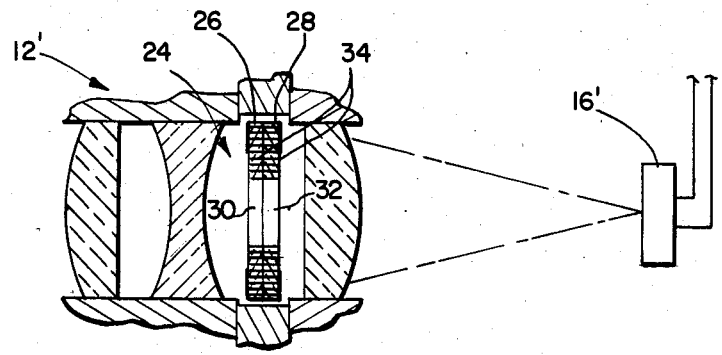
FIG. 3 is a diagrammatic view showing another embodiment of the present invention; and, FIGS. 4A–C illustrate a sequence of enlarged fragmentary views showing the progressively overlapping of partially filtered sweep apertures.

In FIG. 2, there is shown the relative spectral sensitivity curve A of such a silicon type photodetector. As observed from the curve A, such detectors are relatively more sensitive to red and near infrared wavelengths than, for example, blue wavelengths. It follows, therefore, that each pixel forming the CCD array is provided with a radiation sensitive region which is relatively more sensitive to one group of wavelengths (e.g. red) as opposed to another group of wavelengths (e.g. blue). The electrical output characteristics or parameters of the CCD array 16 change in a manner which is directly proportional to its sensitivity (S), the irradiance (E) of radiant energy incident on CCD array 16, while being inversely proportional as the square of the f-number of the lens assembly 12. As will be described, by changing the f-number of the lens assembly 12, and the spectral composition of the incident radiation, the output of the photoelectric detector 14 will correspondingly vary.

Formed integrally with the lens assembly 12 is a spectral filter arrangement 18 made in accordance with the present invention. Essentially the spectral filter arrangement 18 is constructed and arranged to alter the composition of spectral energy incident on the CCD array 16 by creating multiple transmission zones which have correspondingly different f-numbers. In this manner, the spectral filter arrangement compensates for the fact that the CCD array 16 is relatively more sensitive to red wavelengths than blue wavelengths. As earlier indicated with silicon based charge-couple devices the blue content of an image resulting from a video signal derived from a CCD element tends to be weak and electrically noisy.

The spectral filtering arrangement 18 improves that parameter of the CCD array 16 output attributable to blue light without reducing undesirably the content and focusing of red and green wavelengths. Accordingly, the spectral filtering arrangement 18 compensates for the noted bias of the CCD array 16 for red light. More specifically, the filter arrangement 18 is defined by an absorption spectral filter for substantially exclusively transmitting blue wavelengths. Moreover, the filter arrangement has an annular shape which also defines the boundaries of a central zone 20 which passes all spectral wavelengths including red, green and blue. Thus, the annular filter 18 defines a central, non-filtered zone 20 which substantially transmits the wavelengths excluded by reason of the filter. Also there is created a second zone 22 which is inclusive of the filter and the central zone 20. This second zone is to be considered in effect a transmission zone for blue wavelengths.

For effecting a change in the f-numbers of the lens assembly 12, the filter arrangement 18 is at the aperture stop location. Thus, the annular filter 18 defines the apparent diameter for blue wavelengths. Moreover, having the filter at the aperture stop location means that the spectral wavelengths are uniformly distributed over the photoresponsive surface of the CCD. The apparent diameter of the aperture stop for the red and green wavelengths is the diameter of the noted central zone. It should be mentioned, that the f-numbers of any lens system is equal to the apparent diameter of the lens aperture divided into the focal length of the lens.

Because of the spectral filter arrangement, the lens assembly 12 has a relatively smaller f-number for blue wavelengths than the f-number for the red and green wavelengths. As indicated earlier, the output of the photoelectric detector is inversely related to the square of the f-number. As a result, the composition of spectral energy in the blue wavelength region is boosted sufficiently to counteract for the fact that the silicon type CCD array 16 is relatively less responsive to blue wavelengths. Because, in this lens assemby 12 the f-number for blue light is smaller than for red, there is generally less sharpness of blue light on the CCD array 16 than for red in the presence of any imperfect focus.

In this connection, the present invention recognizes that the human eye cannot easily discern out-of-focus blue light as well as it can discern out-of-focus red and green light. Consequently, proper focusing of blue light can be sacrificed somewhat for the gain in the output of the CCD array attributable to the blue light. The human eye does, however, readily discern lack of proper focusing for red and green light. Consequently, the shortcomings that one would expect by reason of using a blue filter that causes the blue spectral wavelength to be unsharp are diminished. Of course, the human eye can discern out-of-focus blue light, but there is a greater latitude for lack of sharpness in blue light that the eye can tolerate without discerning it. Therefore the lens and blue filter as described provide an adequate depth of field for imaging purposes. With the annular filter 18 the red and green wavelengths have good depth of field characteristics.

Also in accordance with the present invention, the lens assembly 12 can be formed such that it is well corrected for the center zone 20, and less well corrected for the second zone 22. Thus, a less expensive lens can be used. Use of a less well corrected annular segment is possible because only blue light is being transmitted there. As noted, the eye is less discerning of aberrations and lack of proper sharpness of blue light.

Although the previous embodiment described use of a stationary spectral filter arrangement, it is within the scope of this invention to have the spectral filter being associated with a shutter blade.

Reference is now made to FIGS. 3 and 4A–C for depicting an arrangement using a filter arrangement associated with blades which pass in overlying relationship to the CCD array 16'. The structure of this embodiment which is used in the previous embodiment will be represented by the same number, but with the addition of a prime marking.

Included in the shutter arrangement 24 is a pair of shutter blades 26, 28 of the so-called scanning aperture type. Examples of such shutter blades 26, 28 and their operation in exposure control situations is described more fully in commonly assigned U.S. Pat. Nos. 4,040,751 and 3,641,889. For purposes of understanding this invention, such a blade arrangement includes a pair of oppositely moving blades that have lens apertures 30, 32 which coincide and progressively provide, in response to counter-reciprocation, selectively variable apertures relative the lens assembly 12' and the CCD array 16' for purposes of controlling exposure.

Figure 4A:
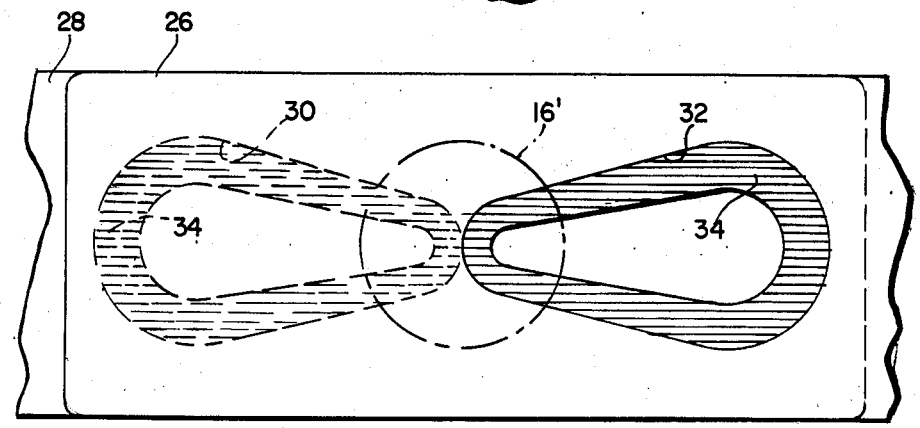
Figures 4B, 4C:
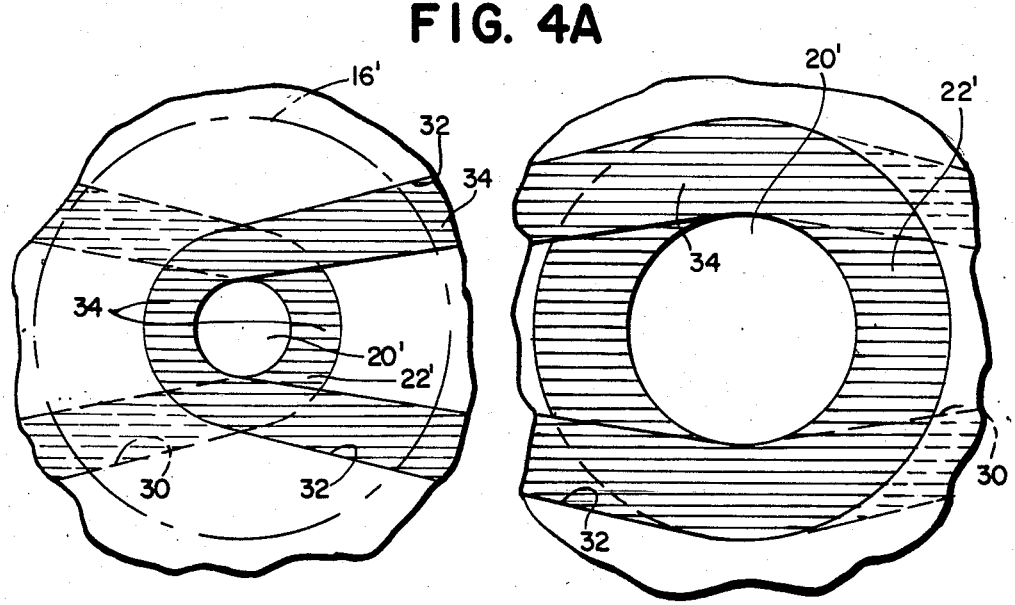

The blades 26, 28 can be made of material which transmits substantially exclusively blue light. The blades 26, 28 are then covered by an opaque material except where it is desired to have the apertures formed, In this embodiment, only the lens apertures 30, 32 are shown. The filtered portion 34 of the apertures 30, 32 are actually made of the blade material and the non-filtered areas of the apertures are, of course, openings. As best seen in FIG. 4A the filtered portion 34 extends at least partially around the rim of each aperture 30, 32. When the blades 26, 28 counter-reciprocate, the aperture 30, 32 coincide to form progressively varying apertures. The apertures 30, 32 and filters 34 cooperate as shown in FIG. 4B to produce a similar spectral filter arrangement as was produced by the stationary filter arrangement 18 in the previous embodiment. In this regard there is formed a central zone 20' which transmits all the spectral wavelengths and a generally annular zone 22' defined by the overlapping filters 34 which transmit substantially blue wavelengths. Since, the blades 26, 28 are at the aperture stop position, the spectral composition of the radiant energy is uniformly distributed over the CCD array 16'.

FIG. 4B shows the cooperation between the apertures 30, 32 and the filtered portions 34 when the blade openings overlap. As shown they form generally concentric spectral zones 20', 22' each of which define separate f-numbers.

In FIG. 4C, the apertures 30, 32 are in their full or open condition and the blue annulus covers about the same portion of the total open area as in FIG. 4B. It should be pointed out that the central zone doesn't always have an annular shape during blade transition, and that the openings can have rhombic shapes inbetween FIGS. 4B and 4C.

Although this embodiment discloses that the spectral filter portions 34 surround the largest parts of the apertures, they need not. Also, the present embodiment discloses that the filter portions 34 on each blade overlap. It should be pointed out that certain portions of the filtered portions 34 of each blade can be removed if these overlap with a segment of a filtered portion of the other aperture.

Although the previous embodiments discussed the use of blue filters for compensating for silicon based photodetectors, it is to be understood that the principles of the present invention also emcompass compensating for other spectral biases of photodetectors by selectively using filters. Significantly, the present invention contemplates that the photoresponsive device instead of being a silicon photodetector could be a photographic film unit wherein it provides a response which varies as a function of the spectral radiation incident thereon. Thus, photoresponsive device as used in the specification and claims means not only a photodetector but a photographic film unit as well.

Since certain changes may be made in the above described apparatus and method without departing from the scope of the invention involved, it is intended that all matter contained in the description thereof or shown in the accompanying drawings shall be interpreted as illustrative and not in a limiting sense.

What is claimed is:

1. Apparatus comprising:
    a photoresponsive device which provides an output varying as a function of the spectral composition of radiation incident thereon;
    an optical assembly structured and arranged to collect scene radiation from a given field of view and direct it onto said photoresponsive device; and,
    spectral filtering means positioned substantially at an aperture stop location of said optical assembly for altering the spectral composition of radiation passing through said optical assembly into at least two spectrally filtered zones having different spectral compositions and different f/numbers and which spectral compositions are then simultaneously directed onto said photoresponsive device by said optical assembly, whereby the spectral composition of radiation reaching said photosensitive device is controlled by said spectral filtering means to effect a desired change in the output of said photoresponsive device.

2. The apparatus of claim 1 including a pair of blades operative to define a scanning radiation transmitting aperture adjacent said aperture stop location and structured and arranged so that a first portion of said aperture defines one of said spectral zones and a second portion of said aperture defines a second of said spectral zones.

3. The apparatus of claim 2 wherein said one spectral zone is unfiltered and said second spectral zone comprises a spectral filter.

4. The apparatus of claim 3 wherein said spectral filter is a blue wavelength pass filter.

5. The apparatus of claim 4 wherein said blue wavelength pass filter is positioned to encircle said unfiltered zone.

6. The apparatus of claim 1 wherein one of said spectral zones is unfiltered and a second of said spectral zones consists of a spectral filter.

7. The apparatus of claim 6 wherein said spectral filter is positioned to encircle said unfiltered spectral zone.

8. The apparatus of claim 6 wherein said spectral filter is a blue wavelength pass filter.

9. A photoresponsive apparatus comprising:
    a photoresponsive device which provides an output having a characteristic which varies as a function of the radiant power and wavelength incident on a photoresponsive surface thereof;
    an optical assembly structured and arranged in relationship to said device and which collects both coherent and incoherent scene radiation from a given field of view and directs it to said photoresponsive surface; and,
    spectral filtering means associated with the optical assembly for altering simultaneously the composition of coherent and incoherent spectral energy incident on said photoresponsive surface into at least two spatially separated and spectrally filtered zones, each one of which transmits respectively different proportionalities of wavelengths, said filtering means being positioned substantially at an aperture stop location of said optical assembly, whereby said optical assembly is provided with different f-numbers for each of the respectively different proportionalities of wavelengths such that the spectral composition of incident radiation reaching said surface is controlled by said zones to effect a desired change in the resultant output characteristic of said photoresponsive device.

10. The apparatus of claim 9 wherein spectral filtering means includes at least one spectral filter stationarily positioned at the aperture stop, said filter being annular in configuration and which defines the bounds of a non-filtered first or central zone and a second or surrounding zone which surrounding zone includes said annular filter and said central zone.

11. The apparatus of claim 10 wherein said spectral filter transmits substantially exclusively blue wavelengths, while a non-filtered central zone transmits the visual spectral frequencies including blue wavelengths, whereby said second zone has an f-number different from said central zone, such that the red and green wavelengths transmitted through said central zone will in general produce a sharper optical image than the blue wavelengths transmitted through both of said zones.

12. The apparatus of claim 10 wherein said optical assembly includes a portion which is well corrected for aberrations for said central zone and is less well corrected for that portion of said second zone which surrounds said central zone.

13. The apparatus of claim 9 wherein said spectral filtering means includes a shutter blade assembly movable between operative and inoperative positions and having an aperture passing in overlying relationship to said photoresponsive surface and being at an aperture stop position, said filtering means including a spectral filter associated with said blade assembly such that during movement of said blade assembly said filter create a plurality of spectral zones, each of which provides said optical assembly with different f-numbers for each of said spectral zones.

14. The apparatus of claim 9 wherein said spectral filtering means includes a scanning shutter arrangement having a pair of counter reciprocating blades, each of said blades including an aperture and having a spectral filter associated with said apertures, each of said filters being constructed and arranged to cooperate with the other of said apertures so that during counter-reciprocating movement of said blades, said filters cooperate to define a pair of spectral zones, said pair of zones including a generally central first zone and second zone which includes a portion which surrounds said first zone and is inclusive thereof.

15. The apparatus of claim 14 wherein said spectral filters cooperate so that said central zone is not spectrally filtered and said surrounding portion is spectrally filtered and forms a generally annular shape.

16. The apparatus of claim 15 wherein said spectral filter transmits substantially exclusively blue wavelengths.

17. An image enhancing apparatus comprising:

an array of charge-couple devices which provide an output having a characteristic which varies as a function of the radiant power and wavelength incident on photoresponsive surfaces thereof;

an optical assembly structured and arranged in relationship to said device and which collects both coherent and incoherent scene radiation from a given field of view and directs it to said photoresponsive surfaces; and, spectral filtering means for filtering simultaneously the composition of coherent and incoherent spectral energy incident on said surfaces into at least two spectrally filtered zones, each one of which transmits respectively different groups of wavelengths, said filtering means being positioned substantially at an aperture stop location of said optical assembly whereby said optical assembly is provided with different f-numbers for each of the respectively different groups of wavelengths such that the spectral composition of incident radiation on said surfaces is controlled by said zones to effect a desired change in the output characteristics of said device.

18. A method of controlling scene radiation incident on a photoresponsive device as a function of the spectral composition of radiation incident thereon; comprising:

positioning an optical assembly structured and arranged to collect scene radiation from a given field of view and direct it onto said photoresponsive device; and, positioning spectral filtering means positioned substantially at an aperture stop location of said optical assembly for altering the spectral composition of radiation passing through the optical assembly into at least two spectrally filtered zones having different spectral compositions and different f/numbers and which are then simultaneously directed onto the photoresponsive device by the optical assembly, whereby the spectral composition of radiation reaching the photosensitive device is controlled by said spectral filtering means to effect a desired change in the output of the photoresponsive device.

19. A method of changing an output characteristic of a photoresponsive device which provides an output having a characteristic which varies as a function of the radiant power and wavelength incident on a photoresponsive surface thereof comprising the steps of:

positioning an optical assembly structured and arranged in relationship to said device so as to collect both coherent and incoherent scene radiation from a given field of view and direct it to said photoresponsive surface; and, positioning a spectral filtering arrangement at an aperture stop position of the optical assembly for altering simultaneously the composition of coherent and incoherent spectral energy incident on said photoresponsive surface into at least two (spectral) spectrally filtered zones, each one of which transmits different proportionalities of wavelengths and which provide the optical assembly with correspondingly different f-numbers so as to change the spectral composition incident on the surface so as to effect a desired change in the output characteristics of the photoresponsive device.

20. The method of claim 19 wherein said positioning of said spectral filter includes placing a generally annular spectral filter at said aperture stop position, whereby said filter defines a non-filtered central zone and a second zone which surrounds the central zone and which is spectrally filtered, the second zone also being inclusive of the central zone.

21. The method of claim 20 wherein the spectral filter transmits substantially exclusively blue wavelengths and the central zone transmits substantially all spectral wavelengths such that the central zone transmits red, blue and green wavelengths which tend to be in focus and the blue wavelengths passing the surrounding portion of the second zone are slightly out-of-focus, whereby the signals generated by the out-of-focus blue wavelengths do not affect the human visual response.

22. The method of claim 19 wherein said positioning step includes placing a spectral filter having a predetermined configuration in association with at least one aperture of a movable shutter blade arrangement, said placing step includes placing said filter and said blade for movement along a path which coincides at the aperture stop location of the optical assembly, whereby said filter when passing in overlying relationship to said device defining a non-filtered central zone and a second zone which surrounds the central zone and which is spectrally filtered, the second zone being inclusive of the central zone.

23. The method of claim 22 wherein the spectral filter transmits substantially exclusively blue wavelengths and the central zone transmits substantially all spectral wavelengths such that the central zone transmits red, blue and green wavelengths which tend to form a sharper optical image and the blue wavelengths passing the surrounding portion of the second zone may be slightly blurred, whereby the signals generated by the unsharp blue wavelengths do not affect the human visual response.

* * * * *